United States Patent
Jin et al.

(10) Patent No.: US 12,132,743 B2
(45) Date of Patent: Oct. 29, 2024

(54) TRAIL RECORDING SYSTEM AND DATA VERIFICATION METHOD

(71) Applicant: Hitachi, Ltd., Tokyo (JP)

(72) Inventors: Yusuke Jin, Tokyo (JP); Nishio Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 233 days.

(21) Appl. No.: 17/783,494

(22) PCT Filed: Nov. 19, 2020

(86) PCT No.: PCT/JP2020/043164
§ 371 (c)(1),
(2) Date: Jun. 8, 2022

(87) PCT Pub. No.: WO2021/124784
PCT Pub. Date: Jun. 24, 2021

(65) Prior Publication Data
US 2023/0009460 A1 Jan. 12, 2023

(30) Foreign Application Priority Data

Dec. 17, 2019 (JP) ................................. 2019-227562

(51) Int. Cl.
*H04L 29/06* (2006.01)
*H04L 9/40* (2022.01)
*H04L 67/12* (2022.01)

(52) U.S. Cl.
CPC ............ *H04L 63/123* (2013.01); *H04L 67/12* (2013.01)

(58) Field of Classification Search
CPC ........ H04L 63/123; H04L 67/12; G06F 21/64
See application file for complete search history.

(56) References Cited

U.S. PATENT DOCUMENTS

2011/0184580 A1* 7/2011 Kawamoto ............... H02J 3/14
700/295
2012/0303973 A1* 11/2012 Newsome ............... H04L 67/12
713/189
(Continued)

FOREIGN PATENT DOCUMENTS

JP 2004-350085 A 12/2004
JP 2013-506369 A 2/2013
(Continued)

OTHER PUBLICATIONS

Pinson et al., "A New Standardized Method for Objectively Measuring Video Quality", IEEE Transactions on Broadcasting, vol. 50, No. 3, Sep. 2004.*
(Continued)

*Primary Examiner* — Morshed Mehedi
(74) *Attorney, Agent, or Firm* — Volpe Koenig

(57) ABSTRACT

A trail recording system includes a trail recording apparatus and a report receiving apparatus, the trail recording apparatus: holds a plurality of measurement values measured by a sensor, and trail data generated based on at least some of the plurality of measurement values; and transmits the trail data to the report receiving apparatus, the report receiving apparatus transmit, to the trail recording apparatus, a request indicating the trail data of the sensor that is an audit target, the trail recording apparatus transmits, to the report receiving apparatus, out of the plurality of measurement values, measurement values that have been used to generate the indicated trail data, the report receiving apparatus verifies, based on the trail data and the measurement values received from the trail recording apparatus, whether the at least some of the plurality of measurement values measured by the sensor are tampered is verified.

10 Claims, 8 Drawing Sheets

(56) References Cited

U.S. PATENT DOCUMENTS

| | | | | |
|---|---|---|---|---|
| 2013/0080118 A1* | 3/2013 | Stergiou | ............... | G16Z 99/00 |
| | | | | 702/189 |
| 2016/0072808 A1* | 3/2016 | David | ............... | H04L 63/126 |
| | | | | 713/158 |
| 2020/0221270 A1* | 7/2020 | Ikkaku | ............... | H04L 67/06 |

FOREIGN PATENT DOCUMENTS

| | | |
|---|---|---|
| JP | 2019-74956 A | 5/2019 |
| WO | 2011039037 A1 | 4/2011 |

OTHER PUBLICATIONS

International Search Report and Written Opinion of Application No. PCT/JP2020/043164, mailed Feb. 16, 2021.

* cited by examiner

700

| SENSOR DATA MANAGEMENT TABLE | | | | |
|---|---|---|---|---|
| SENSOR DATA ID | SENSOR ID | MEASUREMENT VALUE | TIME STAMP | TRAIL DATA |
| D001 | S001 | 120 | 20190930 08:10:00 | H001 |
| D002 | S002 | 3500 | 20190930 08:10:20 | H001 |
| D003 | S001 | 130 | 20190930 08:11:00 | H001 |
| D004 | S002 | 3800 | 20190930 08:11:40 | H001 |
| D005 | S001 | 150 | 20190930 08:12:00 | H002 |
| D006 | S002 | 3300 | 20190930 08:12:60 | H002 |
| D007 | S001 | 140 | 20190930 08:13:00 | H002 |
| D008 | S002 | 3600 | 20190930 08:13:80 | H002 |
| ... | ... | ... | ... | ... |
| 701 | 702 | 703 | 704 | 705 |

| TRAIL MANAGEMENT TABLE | | | |
|---|---|---|---|
| TRAIL ID | TRAIL DATA | TARGET SENSOR | |
| E001 | H001 | S001,S002 | |
| ... | ... | ... | ... |
| 801 | 802 | 803 | |

| SEARCH CRITERIA MANAGEMENT TABLE | | | | | | |
|---|---|---|---|---|---|---|
| REPORT CRITERIA ID | REPORT DESTINATION | TARGET SENSOR | SAMPLING RATE | ... | REPORT CYCLE | NEXT REPORT TIME |
| C001 | INVESTOR X | S001 | 2.00 | | 60 | 20190930 08:15 |
| ... | ... | ... | ... | | ... | ... |
| 901 | 902 | 903 | 904 | | 905 | 906 |

| SEARCH RESULT MANAGEMENT TABLE | | | | | |
|---|---|---|---|---|---|
| REPORT ID | REPORT CRITERIA ID | REPORT DESTINATION | TARGET SENSOR | REPORT DATA | REPORT TIME |
| R001 | C001 | INVESTOR X | S001 | {120, 20190930 08:10:00} | 20190930 08:15 |
| ... | ... | ... | ... | ... | ... |
| 1001 | 1002 | 1003 | 1004 | 1005 | 1006 |

FIG. 10

TRAIL RECORDING SYSTEM AND DATA VERIFICATION METHOD

CLAIM OF PRIORITY

The present application claims priority from Japanese patent application JP 2019-227562 filed on Dec. 17, 2019, the content of which is hereby incorporated by reference into this application.

BACKGROUND

The present invention relates to a trail recording system and a data verification method.

Sophistication of analysis by utilization of sensor data is advancing, and JP 2019-74956 A is known as a technology which enables distribution and sharing of sensor data. In JP 2019-74956 A, there is described an "information processing system 1 including input modules 10 which input sensor data, a data processing module 20 which executes predetermined processing for the sensor data input from the input modules 10 and which create distributed ledgers indicating histories of the processing, a storage module 30 which stores the sensor data processed by the data processing module 20, and a utilization module 40 which utilizes the sensor data stored in the storage module 30 (see Abstract)."

With the technology as described in JP 2019-74956 A, there is a case in which, in a report operation using a large amount of sensor data, required processing (sampling, access control, and the like) that varies depending on a use of the sensor data, or a destination to which the sensor data is provided, is performed on the sensor data and only part of the data is then reported to a specific participant.

When a hash value to be used to prove tamper resistance of data is calculated based on unprocessed sensor data, determination on whether fraudulence has occurred during the processing, for the purpose of an audit about intactness of data with regards to tampering, cannot be executed by the technology as described in JP 2019-74956 A without using every piece of the sensor data that has been used in the calculation.

SUMMARY OF THE INVENTION

It is an object of at least one aspect of this invention to verify, even in a case in which only part of sensor data is reported, that original sensor data has not been tampered.

In order to solve the above problems, the at least one aspect of this invention adopts to following structures. A trail, recording system includes a trail recording apparatus and a report receiving apparatus, the trail recording apparatus is configured to: hold sensor data indicating a plurality of measurement values measured by a sensor, and trail data generated based on at least some of the plurality of measurement values; and transmit the trail data to the report receiving apparatus, the report receiving apparatus is configured to transmit, to the trail recording apparatus, a request indicating the trail data of the sensor that is an audit target, the trail recording apparatus being configured to transmit, to the report receiving apparatus, out of the plurality of measurement values, measurement values that have been used to generate the indicated trail data, the report receiving apparatus being configured to execute first verification processing in which, based on the trail data and the measurement values received from the trail recording apparatus, whether the at least some of the plurality of measurement values measured by the sensor are tampered is verified.

The at least one aspect of this invention can verify, even in a case in which only part of sensor data is reported, that original sensor data has not been tampered.

Problems, configurations, and effects which are not mentioned above are explained in the following embodiments.

BRIEF DESCRIPTIONS OF DRAWINGS

The present invention can be appreciated by the description which follows in conjunction with the following figures, wherein:

FIG. 7 is an example of a sensor data management table according to the First Embodiment;

FIG. 8 is an example of a trail management table according to the First Embodiment;

FIG. 9 is an example of a search criteria management table according to the First Embodiment;

FIG. 10 is an example of a search result management table according to the First Embodiment.

DETAILED DESCRIPTION OF THE PREFERRED EMBODIMENT

Figure 1:
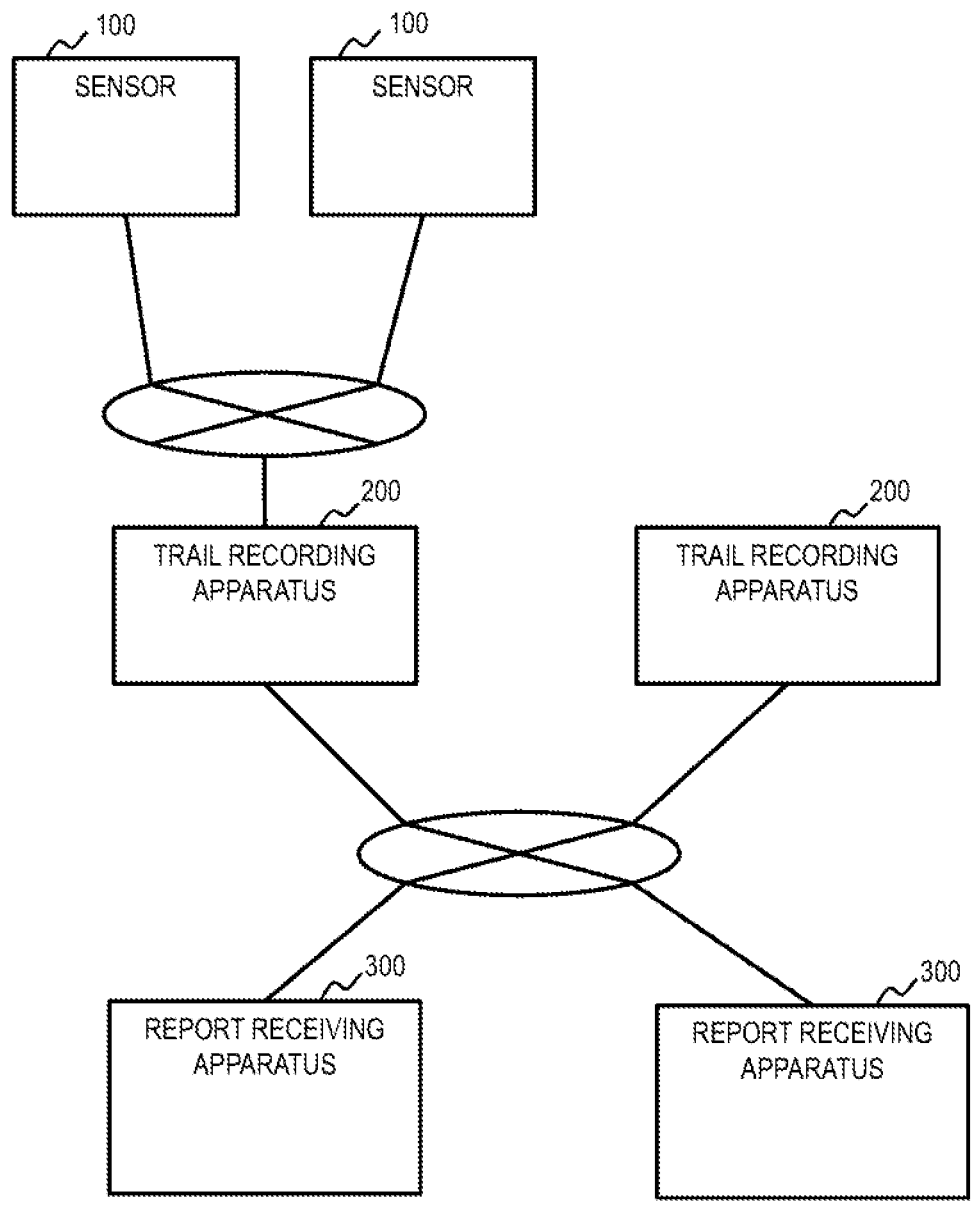
FIG. 1 is a block diagram for illustrating a configuration example of a trail recording system according to the First Embodiment.

In the following, an embodiment of the present invention is explained referring the attached drawings. In the drawings, the same configuration has the same reference letter. The embodiment is an example to achieve the present invention and does not limit a technical range of the present invention.

First Embodiment

FIG. 1 is a block diagram for illustrating a configuration example of a trail recording system. The trail recording system is used in, for example, a community including a power generation business organization, an investor for the power generation business organization, a financial organization which issues claims of the power generation business organization, an auditing organization which audits power generation performance, and the like, to record and share trails about intactness of power generation data (sensor data) with regards to tampering.

The trail recording system includes, for example, one or more sensors 100 which measure power generation amount data of one or more power generators owned by the power generation business organization, a trail recording apparatus 200 which creates and records trail data for enabling verification that sensor data of the one or more sensors 100 is intact with regards to tampering, and a report receiving apparatus 300 for receiving a report on power generation performance pertaining to sensor data of the one or more sensors 100 attached to one or more power generators of a power generation business organization that is a specific investment destination.

The one or more sensors 100 are coupled to at least one trail recording apparatus 200 via the Internet or a similar network, and the at least one trail recording apparatus 200 is coupled to the report receiving apparatus 300 via the Internet or a similar network.

Examples of a community including a power generation business organization, an investor, a financial organization, and an auditing organization include a green community which aims to reduce $CO_2$ by solar power generation, wind power generation, or other forms of power generation that use sources other than fossil fuels. At least one trail recording apparatus 200 or one report receiving apparatus 300 is placed at each company included in this community. An example in which a green community uses the trail recording apparatus 200 and the report receiving apparatus 300 is described below.

<Trail Recording Apparatus>

Figure 2:
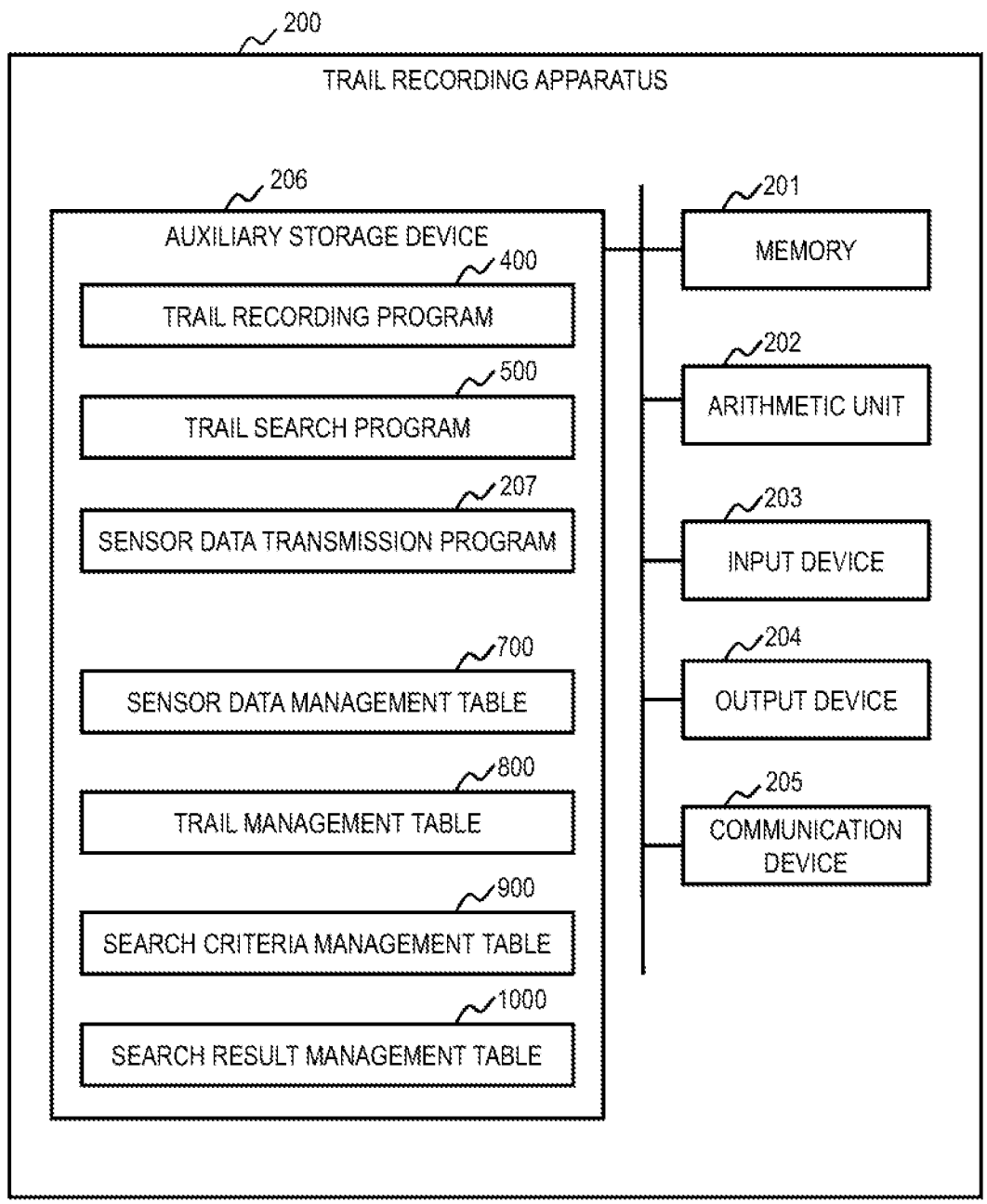
FIG. 2 is a block diagram for illustrating a configuration example of a trail recording apparatus according to the First Embodiment.

FIG. 2 is a block diagram for illustrating a configuration example of each trail recording apparatus 200. Each trail recording apparatus 200 is configured from, for example, a computer including a memory 201, an arithmetic unit 202, an input device 203, an output device 204, a communication device 205, and an auxiliary storage device 206.

The arithmetic unit 202 includes a processor, and executes a program loaded onto the memory 201. The memory 201 includes a read only memory (ROM), which is a nonvolatile memory device, and a random access memory (RAM), which is a volatile memory device. The ROM stores, for example, an invariant program (for example, basic input/output system (BIOS)). The RAM is a dynamic random access memory (DRAM) or other such high-speed volatile memory device, and temporarily stores a program to be executed by the arithmetic unit 202 and data to be used at a time of execution of the program.

The auxiliary storage device 206 is, for example, a large-capacity and non-volatile storage device such as a magnetic storage device (hard disk drive (HDD)) and a flash memory (solid state drive (SSD)). A program to be executed by the arithmetic unit 202 and data to be used at a time of execution of the program are stored in the auxiliary storage device 206. Specifically, the program is read out from the auxiliary storage device 206, loaded onto the memory 201, and executed by the arithmetic unit 202.

The program to be executed by the arithmetic unit 202 is provided to the trail recording apparatus 200 through intermediation of a removable medium (for example, a CD-ROM or a flash memory) or through the network, and is stored in the nonvolatile auxiliary storage device 206 being a non-transitory storage medium. Therefore, the trail recording apparatus 200 preferably includes an interface which reads data from the removable medium. The same applies to the report receiving apparatus 300.

The auxiliary storage device 206 holds, for example, a trail recording program 400 which records trail data for enabling verification of intactness of sensor data with regards to tampering, and a trail search program 500 for extracting report target sensor data pertaining to a power generator of a power generation business organization that is an investment destination of a specific investor.

For example, the arithmetic unit 202 functions as a trail recording module by operating in accordance with the trail recording program 400 loaded onto the memory 201, and functions as a trail search module by operating in accordance with the trail search program 500 loaded onto the memory 201. The same applies to a relationship between a program and a function module that are included in the report receiving apparatus 300.

Some or all of the functions to be executed by the arithmetic unit 202 may be implemented by hardware such as an application specific integrated circuit (ASIC) and a field-programmable gate array (FPGA). The same applies to some or all of functions executed by an arithmetic unit included in the report receiving apparatus 300.

The auxiliary storage device 206 also holds a sensor data management table 700 in which sensor data received from the one or more sensors 100 is held, a trail management table 800 in which the trail data is held, a search criteria management table 900 in which search criteria for extracting report target sensor data pertaining to a power generator of a power generation business organization that is an investment destination of a specific investor are held, and a search result management table 1000 in which results of a search by the trail search program 500 are held.

In the first embodiment, information used by the trail recording system is independent of data structure and may be expressed in any data structure. For example, a data structure appropriately selected from a list, a database, and a queue may store the information.

The input device 203 is a device which receives input from an operator, and is a keyboard, a mouse, or a touch panel, for example. The output device 204 is a device from which a result of executing a program is output in a format visibly recognizable to the operator, and is a display or a printer, for example. The communication device 205 is coupled to a network to hold communication to and from another apparatus by following a predetermined protocol.

Each trail recording apparatus 200 is a computer system configured on a single physical computer or a plurality of logically or physically configured computers, and may operate in separate threads on the same computer or may operate on a virtual computer built from a plurality of physical computer resources. The same applies to the report receiving apparatus 300.

<Trail Recording Apparatus>

Figure 3:
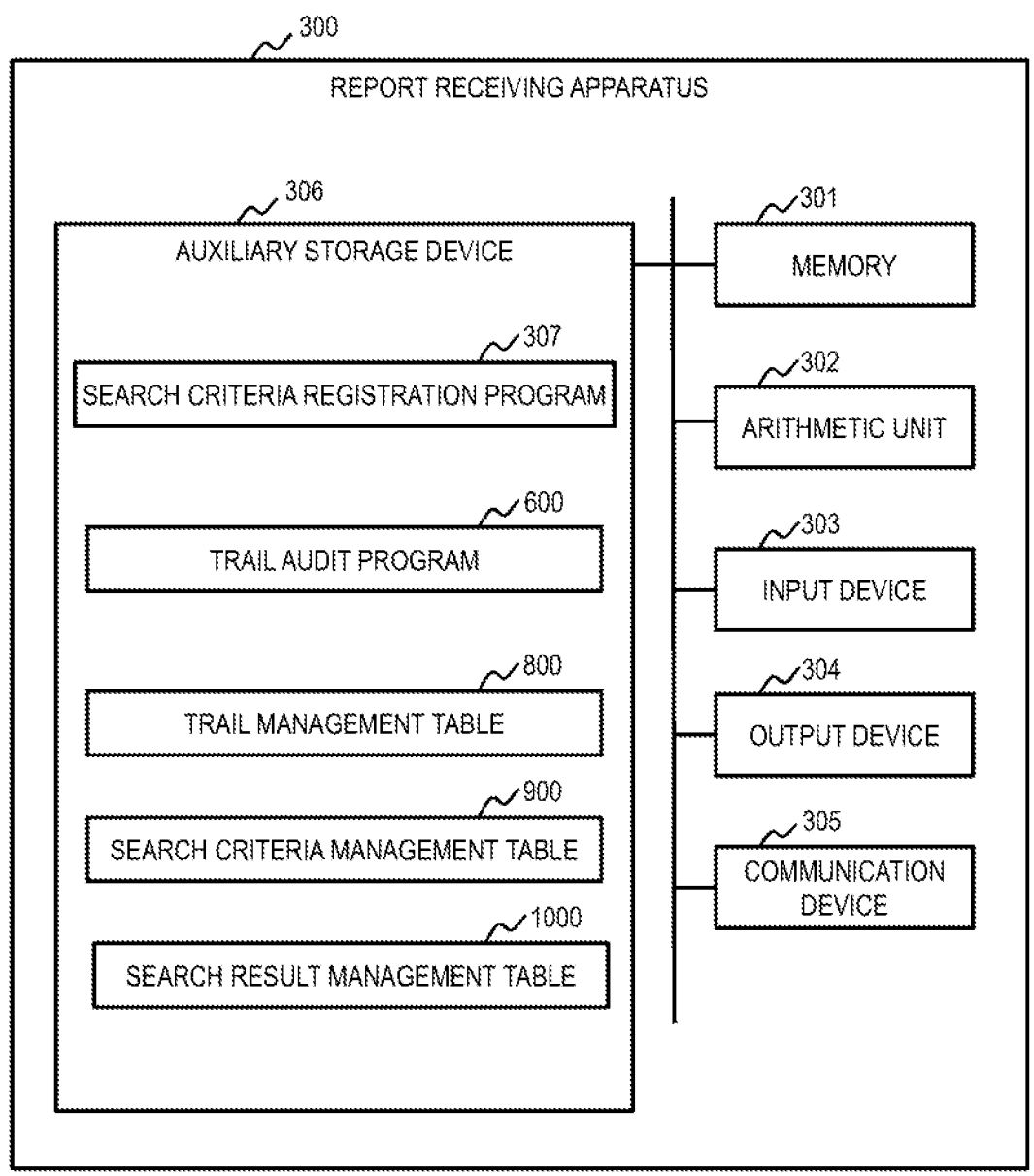
FIG. 3 is a block diagram for illustrating a configuration example of a report receiving apparatus according to the First Embodiment.

FIG. 3 is a block diagram for illustrating a configuration example of each report receiving apparatus 300. Each report receiving apparatus 300 is configured from, for example, a computer including a memory 301, an arithmetic unit 302, an input device 303, an output device 304, a communication device 305, and an auxiliary storage device 306. Descriptions of the memory 301, the arithmetic unit 302, the input device 303, the output device 304, the communication device 305, and the auxiliary storage device 306 as hardware are the same as the descriptions of the memory 201, the arithmetic unit 202, the input device 203, the output device 204, the communication device 205, and the auxiliary storage device 206, respectively, and are accordingly omitted.

The auxiliary storage device 306 holds, for example, a search criteria registration program 307 and a trail audit program 600. The search criteria registration program 307 registers search criteria for receiving only sensor data related to a sensor of a power generator of a power generation business organization that is an investment destination of an investor who receives a report. The trail audio program 600 executes an audit to check whether sensor data about which a report has been received is intact with regards to tampering.

The auxiliary storage device 306 also holds the trail management table 800, the search criteria management table 900, and the search result management table 1000. Descriptions about the trail management table 800, the search criteria management table 900, and the search result management table 1000 are the same as the descriptions given with reference to FIG. 2, and are accordingly omitted.

<Data Structure>

FIG. 7 is an example of the sensor data management table 700. The sensor data management table 700 of each trail recording apparatus 200 owned by a power generation business organization that owns one or more power generators at which the one or more sensors 100 are installed holds information about sensor data transmitted from the one or more sensors 100.

The sensor data management table 700 includes, for example, a sensor data ID field 701, a sensor ID field 702, a measurement value field 703, a time stamp field 704, and a trail data field 705. The sensor data. ID field 701 holds a name or an identifier determined for a piece of sensor data by the power generation business organization. Each sensor data. ID is a value unique throughout the green community.

The sensor ID field 702 holds a sensor ID that is a value by which a sensor is uniquely identified throughout the green community. The measurement value field 703 holds measurement values (for example, power generation amounts) which is measured by the one or more sensors 100. The measurement value field 703 holds, for example, a power generation amount per minute. The time stamp field. 704 holds a date/time at which the value recorded in the measurement value field 703 has been obtained. The trail data field 705 holds trail data indicating intactness of the piece of sensor data with regards to tampering.

FIG. 8 is an example of the trail management table 800. The trail management table 800 is distributed and shared among participants of the green community, and is set by the trail recording apparatus 200 or the report receiving apparatus 300. The trail management table 800 includes, for example, a trail ID filed 801, a trail data field 802, and a target sensor field 803.

The trail ID field 801 holds a name or an identifier of a piece of trail data. The trail data field 802 holds the piece of trail data which is created from measurement values (values other than the measurement values, such as time stamps and sensor IDs, may be used in addition to the measurement values, or the other values may be used instead of the measurement values) of a plurality of pieces of sensor data, and which indicates intactness of those pieces of sensor data with regards to tampering. The target sensor field 803 holds a sensor ID of each of a plurality of sensors used in the creation of the piece of trail data. The piece of trail data may be created from values of a plurality of pieces of sensor data provided by a single sensor, or may be created from values of pieces of sensor data provided by a plurality of sensors.

FIG. 9 is an example of the search criteria management table 900. The search criteria management table 900 is distributed and shared among participants of the green community, and is set by the trail recording apparatus 200 or the report receiving apparatus 300.

The search criteria management table 900 includes, for example, a report criteria ID field 901, a report destination field 902, a target sensor field 903, a sampling rate field 904, a report cycle field 905, and a next report time field 906.

The report criteria ID field 901 holds a name or an identifier of a piece of report criteria data. The report destination field 902 holds a name or an identifier of a report destination company defined in report criteria. The target sensor field 903 holds a sensor ID of each sensor out of the one or more sensors 100 that is a report target defined in the report criteria.

The sampling rate field 904 holds a cycle (for example, seconds) of obtaining report target data. For example, when the cycle of obtaining sensor data is 1 second, and the sampling rate is 2.00 seconds, it is defined that data is to be extracted at 2-second intervals as a report target. The report cycle field 905 holds a cycle (for example, seconds) of reporting to a party defined in the report destination field 902.

The next report time field 906 holds a time at which the next report to the party defined in the report destination filed 902 is scheduled. Each time the trail search program 500 executes reporting, a next report time is calculated by adding the length of the cycle indicated in the report cycle field 905 to the original next report time, and the value of the next report time field 906 is updated to the calculated time.

FIG. 10 is an example of the search result management table 1000. The search result management table 1000 is distributed and shared among participants of the green community, and is set by the trail recording apparatus 200 or the report receiving apparatus 300.

The search result management table 1000 includes, for example, a report ID filed 1001, a report criteria ID field 1002, a report destination field 1003, a target sensor field 1004, a report data field 1005, and a report time field 1006.

The report ID field 1001 holds a name or an identifier of a piece of report data. The report criteria ID field 1002 holds an ID of report criteria based on a report. The report destination field 1003 holds a name or an identifier of a report destination that satisfies the report criteria based on the report. The target sensor field 1004 holds a name or an identifier of each target sensor out of the one or more sensors 100 that satisfies the report criteria based on the report. The report data field 1005 holds a piece of report data that is a report target. The report time field 1006 holds a time at which the report has been executed.

<Processing>

Figure 4:
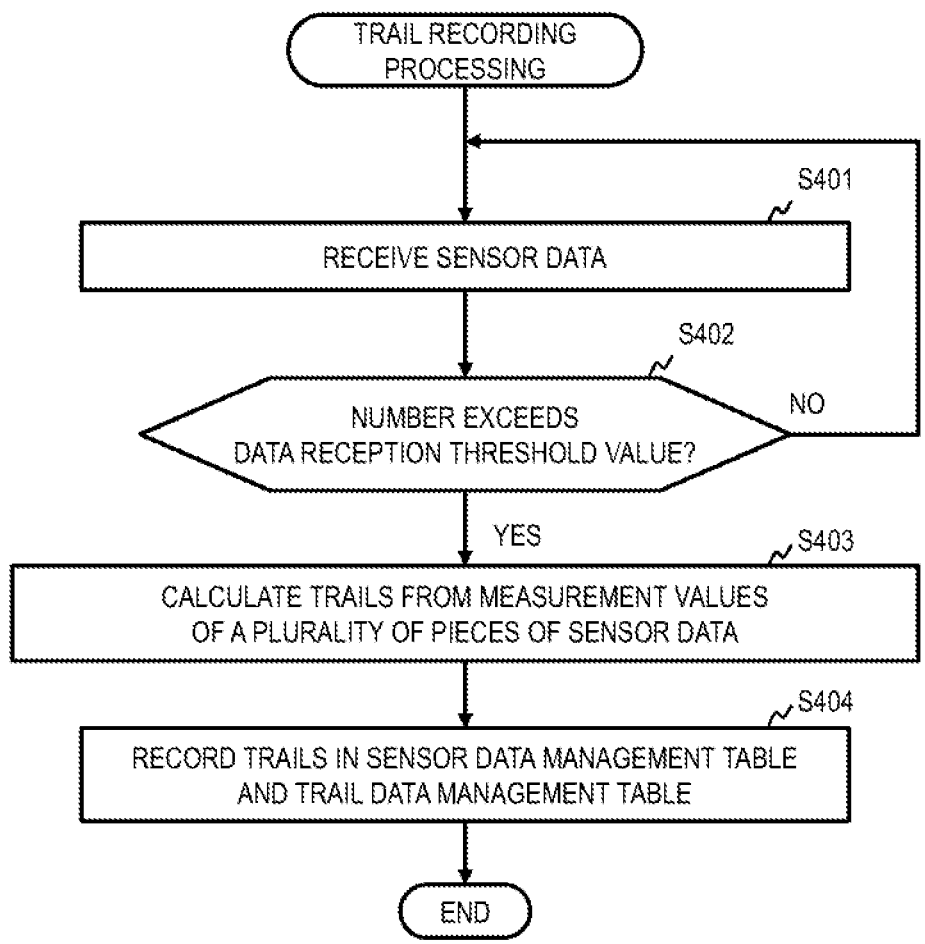
FIG. 4 is a flow chart for illustrating an example of trail recording processing according to the First Embodiment.

FIG. 4 is a flow chart for illustrating an example of trail recording processing executed by the trail recording apparatus 200. The trail recording processing is started when, for example, the trail recording apparatus 200 receives a sensor data transmission preparation completion notification from one of the one or more sensors 100.

The trail recording program 400 of the trail recording apparatus 200 receives pieces of sensor data from the one of the one or more sensors 100 (Step S401). The trail recording program 400 determines whether the number of measurement values of the pieces of sensor data received after the processing is started exceeds a sensor data reception threshold value determined in advance (Step S402).

When it is determined that the number of the sensor values exceeds the sensor data reception threshold value (Step S402: YES), the trail recording program 400 calculates a trail based on a plurality of pieces of sensor data (Step S403), and records the calculated trail in the sensor data management table 700 and the trail management table 800 (Step S404). Details of the processing step of Step S403 and the processing step of Step S404 are described later.

When it is determined that the number of the sensor values is equal to or less than the sensor data reception threshold value (Step S402: NO), the process returns to Step S401, that is, the trail recording program 400 waits for reception of more sensor data.

A specific example of the trail calculation processing of Step S403 is described. The trail recording program 400 creates, from the plurality of pieces of sensor data accumulated in Step S401 and Step S402, trail data usable to detect tampering. The trail recording program 400 extracts or creates tampering detection data for each of measurement values of the plurality of accumulated pieces of sensor data.

An example of the extraction of the tampering detection data is a method that uses an error detecting code (a cyclic redundancy check (CRC) code) attached to the sensor data. An example of the creation of the tampering detection data is a method that calculates a hash value.

The trail recording program 400 uses the tampering detection data extracted from or created for each of the measurement values of the plurality of pieces of sensor data to create one piece of trail data for each of the measurement values of the plurality of pieces of sensor data. The trail recording program 400 can reduce the data amount of trail data even when a large amount of sensor data is received by creating one piece of trail data for each of the measurement values of the plurality of pieces of sensor data.

An example of the method of generating one piece of trail data from the tampering detection data generated from each of the measurement values of the plurality of pieces of sensor data is a method in which a Merkle tree hash is created from extracted or created tampering detection data.

The trail recording program 400 may generate trail data for the measurement value of every piece of sensor data received in Step S401, or may divide measurement values of the sensor data received in Step S401 into groups each including a predetermined number of measurement values to generate trail data for each group.

The trail recording processing of Step S404 is described. The trail recording program 400 records the created trail data in the sensor data management table 700 and the trail management table 800.

For example, when the data reception threshold value is set to 4 and the pieces of sensor data used in the generation of the trail data in Step S403 are pieces of sensor data that have sensor data. IDs "D001" to "D004" held in four records of FIG. 7, reference to the sensor ID field 702 enables the trail recording program 400 to identify the pieces of sensor data indicated by the four records as data generated by the sensors 100 that have sensor IDs "S001" and "S002."

In this case, the trail recording program 400 generates a new trail ID, and stores the trail data (for example, "H001") generated in Step S403 in the trail data field 705 of the sensor data management table 700. The trail recording program 400 may further store the generated trail ID in the sensor data management table 700. The trail recording program 400 further stores the trail ID in the trail ID field 801 of the trail management table 800 and the trail data generated in Step S403 in the trail data field 802, and stores "S001" and "S002" which are the identified sensor IDs in the target sensor field 803.

Figure 5:
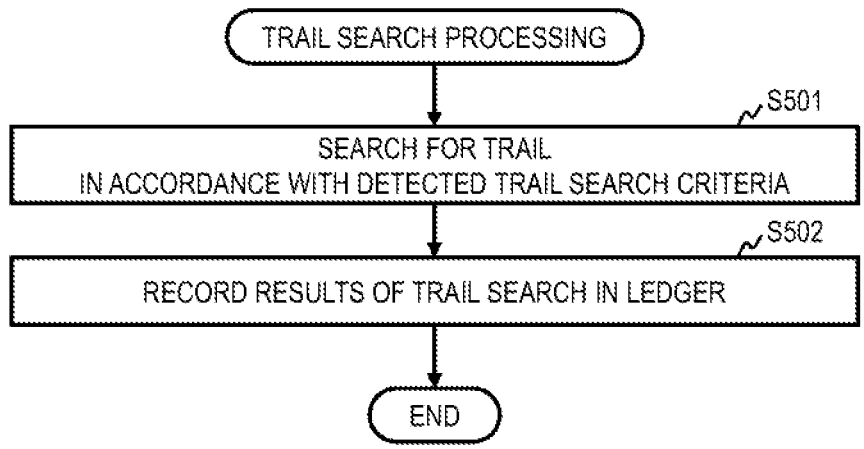
FIG. 5 is a flow chart for illustrating an example of trail search processing according to the First Embodiment.

FIG. 5 is a flow chart for illustrating an example of trail search processing executed by the trail recording apparatus 200. The trail search processing is started with, for example, detection of the arrival of a next report time as a trigger when the trail recording apparatus 200 detects a record of the search criteria management table 900 in which a time indicated in the next report time field 906 has arrived.

The trail search program 500 searches for and extracts sensor data to be reported to an investor from the sensor data management table 700 in accordance with trail search criteria indicated by the detected record (Step S501).

For example, when the next report time of a record of the search criteria management table 900 of FIG. 9 that has "C001" as a report criteria. ID arrives, an associated target sensor is "S001" and the trail search program 500 accordingly extracts records in which the sensor ID is "S001," that is, a record in which the sensor data ID is "D001" and a record in which the sensor data ID is "D003" from the sensor data management table 700 of FIG. 7.

The trail search program 500 further obtains "2 (seconds)" which is the value of the sampling rate in the record of the search criteria management table 900 that has "C001" as the report criteria ID, refers to the time stamp field 704 of the sensor data management table 700, and extracts a record or records of the sensor data management table 700 out of the records extracted above so that time stamps are at an interval of "2 (seconds)" which is the sampling rate. Specifically, in the example of FIG. 7, the trail search program 500 extracts only the record that has "D001" as the sensor ID (that is, the record in which the sensor ID is "D003" is thinned out).

The trail search program 500 subsequently records a result of the extraction in Step S501 in the search result management table 1000 (Step S502). Specifically, the trail search program 500 generates a report ID.

The trail search program 500 then stores the generated report ID in the report ID field 1001, and stores the report criteria ID, a report destination, and the target sensor that are indicated by the record of the search criteria management table 900 in which the time indicated in the next report time field 906 has arrived in the report criteria ID field. 1002, the report destination field 1003, and the target sensor field 1004, respectively.

The trail search program 500 further obtains the current time or a time at which the trail search processing has been started, stores a pair of a measurement value and a time stamp that are indicated by the record extracted from the sensor data management table in the report data field 1005, and stores the obtained time in the report time field 1006.

Figure 6:
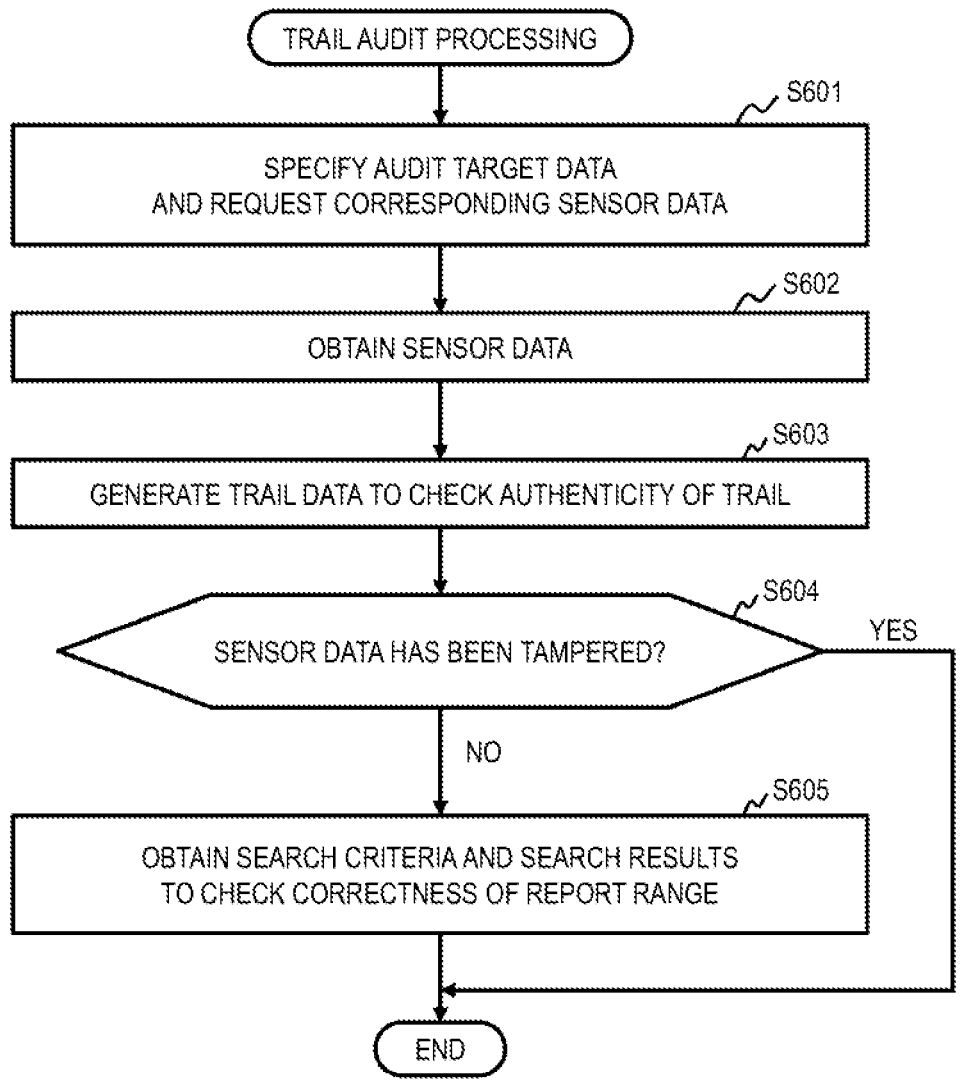
FIG. 6 is a flow chart for illustrating an example of trail audit processing according to the First Embodiment.

FIG. 6 is a flow chart for illustrating an example of trail audit processing executed by the report receiving apparatus 300. The trail audit processing is started with, for example, reception by the report receiving apparatus 300 of a trail audit start instruction including information specifying a piece of report data that is an audit target as a trigger. The trail audit start instruction may be generated by input from a user of the report receiving apparatus 300, or may automatically be issued in predetermined cycles.

The trail audit program 600 identifies the audit target data, and requests sensor data corresponding to this audit target data from the trail recording apparatus 200 (Step S601). A specific example in which the trail audit program 600 receives a trail audit start instruction specifying, as an audit target, data that has "R001" as the report ID in the search result management table 1000 of FIG. 10 is discussed. A report: criteria ID associated with the report ID "R001" in the search result management table 1000 is "C001," and the trail audit program 600 accordingly refers to a record, of the search criteria management table 900 of FIG. 9 that has "C001" as the report criteria ID.

A target sensor indicated by this record is "S001." The trail audit program 600 accordingly refers to the trail management table 800 to confirm that "S001" is included among target sensors of a record in which the trail ID is "E001," and further obtains "H001" which is trail data indicated by this record. The trail audit program 600 requests sensor data that has "H001" as the trail data in the sensor data management table 700 from the trail recording apparatus 200.

The trail audit program 600 subsequently obtains the requested sensor data (Step S602). Specifically, a sensor data transmission program 207, for example, of the trail recording apparatus 200 transmits pieces of sensor data that have "D001" to "D004" as sensor data IDs included in a record of the sensor data management table 700 of FIG. 7 in which the trail data is "H001," and the report receiving apparatus 300 receives the pieces of sensor data.

The trail audit program 600 reconstructs the trail data from the obtained sensor data (Step S603). An algorithm for calculating trail data from sensor data is shared in advance between the trail recording apparatus 200 and the report receiving apparatus 300.

The trail audit program 600 determines whether the sensor data has been tampered based on the reconstructed trail data (Step S604). When it is determined that the sensor data has not been tampered (Step S604: NO), the trail audit program 600 obtains the search criteria and the search results to cheek correctness of a report range (Step S605). When it is determined that the sensor data has been tampered (Step S604: YES), the trail audit program 600 ends the trail audit processing.

Specifically, when it is determined that the trail data "H001," for example, is successfully generated from the obtained sensor data, that is, when it is determined that the sensor data has not been tampered, the process proceeds to Step S605. When it is determined that the sensor data has been tampered, the trail audit program 600 may end the trail audit processing after outputting an alert or taking some other actions.

In Step S605, the trail audit program 600 specifically compares the sensor data obtained in Step S601 (that is, pre-sampling sensor data) to, for example, data that has "S001" as a target sensor in the search criteria management table 900 (that is, a sampling criterion), and report data that has "S001" as a target sensor in the search result management table 1000 (that is, post-sampling sensor data). The trail audit program 600 checks, through the comparison, whether the report conforms to the report criteria, and outputs a result of the check (Step S605).

To give a specific example, the trail audit program 600 extracts the pre-sampling sensor data at a sampling rate indicated in the sampling rate field 904, and determines whether measurement values of the extracted sensor data match the report data indicated, in the report data field. 1005, to thereby check whether the report conforms to the report criteria. In this manner, the report receiving apparatus 300 verifies tamper resistance of a report result and audits the validity of a report range.

The trail audit program 600 can reduce the amount of processing to be executed when sensor data is found to have been tampered by checking the validity of the report range in Step S605 only when it is determined that the sensor data has not been tampered. The trail audit program 600 may also be designed so that the processing step of Step S605 is executed when the sensor data is found to have been tampered as well.

As described above, the trail recording system according to the first embodiment enables recording and sharing of trails about intactness of power generation data (sensor data) with regards to tampering in a community including a power generation business organization, an investor for the power generation business organization, a financial organization which issues claims of the power generation business organization, an auditing organization which audits power generation performance, and the like. Although power generation data about power generation by a power generation business organization is target sensor data in the first embodiment, the target sensor data is not limited thereto.

The report receiving apparatus 300 in the first embodiment can thus verify intactness of sensor data with regards to tampering despite having only part of the sensor data that is a part used to create trail data, which ultimately leads to simultaneous accomplishment of privacy management and auditability of the sensor data.

Although an example in which participants of a green community are a power generation business organization, an investor, a financial organization, an auditing organization, and the like is described in the first embodiment, the participants are not limited thereto, and attributes and a purpose of a community are not limited to those of a green community as well.

A case in which information is held in tables is described in the first embodiment as an example. However, storage location of information is not limited to a table and, for example, schemaless storage may be employed to store data. The first embodiment in which an example of sharing tables between the trail recording apparatus 200 and the report receiving apparatus 300 is described may be modified so that restrictions are placed on viewing of information. For instance, restrictions may be placed so that sensor data of a specific sensor is viewable only to investors for a power generation business organization that owns this sensor.

Although an example in which a green community is formed from a single community is described in the first embodiment, this invention is not limited thereto. For instance, a plurality of sub-communities varying in sharing range may be set in a community so that a different sub-community is used for a different range of disclosure of transaction contents.

In the description of the first embodiment, the trail recording system records and shares trails about intactness of power generation data (sensor data) with regards to tampering. The trail recording system, however, is capable of recording and sharing of trails about intactness of any type of data with regards to tampering.

[Second Emodiment]

A trail recording system according to a second embodiment of this invention shares the trail management table 800, the search criteria management table 900, and/or the search result management table 1000 as a dispersed ledger. Differences from the first embodiment are described, and redundant descriptions about the matters described in the first embodiment are omitted.

Figure 11:
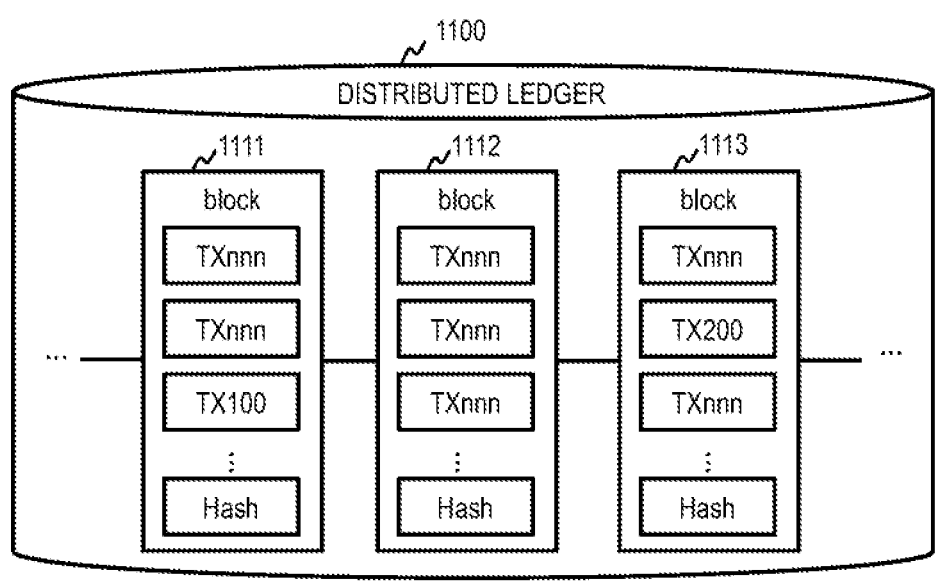
FIG. 11 is an example of a dispersed ledger according to the Second Embodiment.

FIG. 11 is an example of the dispersed ledger. The trail management table 800, the search criteria management table 900, and the search result management table 1000 are implemented by a dispersed ledger 1100 distributed and shared among, for example, the participants of the green community. In the second embodiment, the dispersed ledger 1100 is distributed among the power generation business organization, the investor, the financial organization, and the auditing organization to be stored on the trail recording apparatus 200 and/or the report receiving apparatus 300 owned by each of the power generation business organization, the investor, the financial organization, and the auditing organization so that information about trail data is shared.

The dispersed ledger 1100 may be the trail recording apparatus 200 or the report receiving apparatus 300, or may include the trail recording apparatus 200 and the report receiving apparatus 300.

In the second embodiment, a blockchain is employed for the dispersed ledger 1100. Each record of the tables illustrated in FIG. 8, FIG. 9, and FIG. 10 forms one transaction, and each of blocks (a block 1111, a block 1112, and a block 1113) includes a plurality of transactions and a hash value.

Each block holds contents of a plurality of transactions and a hash value by calculating the hash value of the block from the contents of the plurality of transactions in the block and a hash value of the preceding block.

Examples of the blockchain employed in the second embodiment include a distributed ledger management system combining a peer-to-peer (P2P) network, a consensus algorithm, a smart contract, and an anti-falsification and encryption technology.

In the second embodiment, an example of using decentralizedness, transparency, tamper resistance, failure resistance, and automatic execution (automatic trading) out of characteristics of a blockchain is described. Decentralizedness means that each participant of the blockchain is enabled to manage data through prohibition of exclusive management of data by a specific participant.

Transparency means that information generated by each participant is laid open to all participants to be shared by all participants. Participants participating in a token community are allowed to view all pieces of information and consistency of recorded information is guaranteed.

Tamper resistance means that an apparatus owned by each participant generates a transaction, and transactions are linked to each other in a chain pattern based on electronic signatures and hash values, to thereby inhibit tampering of data. In addition, laying open of information generated by an apparatus owned by each participant discourages tampering of data.

Failure resistance means that data and copies of the data are held in apparatus owned by participants participating in the blockchain and, in the event of a failure in the apparatus owned by some of the participants, damaging or loss of data is accordingly preventable.

Automatic execution (automatic trading means that execution of trading or issuing of information after results of determination about a plurality of requirements are aggregated, or building of a consensus about the issued information, is carried out with efficiency.

Although an example of calculating a hash value of a block from the contents of transactions and from a hash value of a preceding block is described in the second embodiment, this invention is not limited thereto. For instance, each block may store, instead of the contents of transactions, hash values of the contents of transactions and identifiers of the transactions. In this case, it suffices that a hash value of a block is calculated from a hash value of a preceding block, the hash values of the contents of the transactions, and the identifiers of the transactions.

In this case, it suffices that the contents of the transactions are held by an apparatus owned by each participant. Alternatively, the trail recording system may include an apparatus in which the contents of transactions of each participant are stored. When the trail recording system includes this apparatus, the contents of each transaction can be kept private so that the contents of a transaction between participants are provided only to limited participants.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD {Solid State Drive}, or a storage medium such as an IC card, or an SD card.

The drawings show control lines and information lines as considered necessary for explanations but do not show all control lines or information lines in the products. It can be considered that almost of all components are actually interconnected.

What is claimed is:

1. A trail recording system, comprising:
a trail recording apparatus; and
a report receiving apparatus,
the trail recording apparatus being configured to:
hold sensor data indicating a plurality of measurement values measured by a sensor, and trail data generated based on at least some of the plurality of measurement values,
transmit the trail data to the report receiving apparatus,
hold criteria data indicating a sampling rate of measurement values that are a report target to be reported to the report receiving apparatus, out of the plurality of measurement values, and
extract report measurement values from the plurality of measurement values at the sampling rate, and transmit the report measurement values to the report receiving apparatus
the report receiving apparatus being configured to transmit, to the trail recording apparatus, a request indicating the trail data of the sensor that is an audit target,
the trail recording apparatus being configured to transmit, to the report receiving apparatus, out of the plurality of measurement values, measurement values that have been used to generate the indicated trail data,
the report receiving apparatus being configured to:
execute first verification processing in which, based on the trail data and the measurement values received from the trail recording apparatus, whether the at least some of the plurality of measurement values measured by the sensor are tampered is verified,
hold the criteria data, and
execute second verification processing in which, based on the sampling rate, the report measurement values, and the measurement values received from the trail recording apparatus, whether transmission of the report measurement values from the trail recording apparatus conforms to the sampling rate indicated by the criteria data held in the report receiving apparatus is verified.

2. The trail recording system according to claim 1, wherein the report receiving apparatus is configured to execute the second verification processing when it is determined in the first verification processing that the at least some of the plurality of measurement values measured by the sensor are free of tampering.

3. The trail recording system according to claim 1,
wherein the report receiving apparatus is configured to hold the report measurement values as report data, and
wherein at least one type of data out of the trail data, the criteria data, and the report data is managed with use of a distributed ledger including the trail recording apparatus and the report receiving apparatus as nodes.

4. The trail recording system according to claim 1, wherein the trail recording apparatus is configured to generate the trail data for each set of a predetermined number of measurement values out of the plurality of measurement values, based on the predetermined number of measurement values.

5. The trail recording system according to claim 1, wherein the report receiving apparatus is configured to:
   reconstruct the trail data based on the measurement values received from the trail recording apparatus; and
   compare the trail data received from the trail recording apparatus and the reconstructed trail data to verify whether the at least some of the plurality of measurement values measured by the sensor are tampered.

6. A data verification method by a report receiving apparatus that is coupled to a trail recording apparatus,
   the trail recording apparatus being configured to hold sensor data indicating a plurality of measurement values measured by a sensor, and
   the report receiving apparatus being configured to hold trail data generated based on at least some of the plurality of measurement values, and
   the data verification method comprising:
   transmitting, by the report receiving apparatus, to the trail recording apparatus, a request indicating the trail data of the sensor that is an audit target;
   receiving, by the report receiving apparatus, from the trail recording apparatus, out of the plurality of measurement values, measurement values that have been used to generate the indicated trail data;
   holding, by the trail recording apparatus, criteria data indicating a sampling rate of measurement values that are a report target to be reported to the report receiving apparatus, out of the plurality of measurement values;
   extracting, by the trail recording apparatus, report measurement values from the plurality of measurement values at the sampling rate, and transmit the report measurement values to the report receiving apparatus;
   executing, by the report receiving apparatus, first verification processing in which, based on the trail data and the measurement values received from the trail recording apparatus, whether the at least some of the plurality of measurement values measured by the sensor are tampered is verified;
   holding, by the report receiving apparatus, the criteria data; and
   executing, by the report receiving apparatus, second verification processing in which, based on the sampling rate, the report measurement values, and the measurement values received from the trail recording apparatus, whether transmission of the report measurement values from the trail recording apparatus conforms to the sampling rate indicated by the criteria data held in the report receiving apparatus is verified.

7. The data verification method according to claim 6, wherein executing, via the report receiving apparatus, the second verification processing is performed when it is determined in the first verification processing that the at least some of the plurality of measurement values measured by the sensor are free of tampering.

8. The data verification method according to claim 6, further comprising:
   holding, via the report receiving apparatus, the report measurement values as report data, and
   managing at least one type of data out of the trail data, the criteria data, and the report data, via use of a distributed ledger including the trail recording apparatus and the report receiving apparatus as nodes.

9. The data verification method according to claim 6, further comprising:
   generating, via the trail recording apparatus, the trail data for each set of a predetermined number of measurement values out of the plurality of measurement values, based on the predetermined number of measurement values.

10. The data verification method according to claim 6, further comprising:
    reconstructing, via the report receiving apparatus, the trail data based on the measurement values received from the trail recording apparatus; and
    comparing, via the report receiving apparatus, the trail data received from the trail recording apparatus and the reconstructed trail data to verify whether the at least some of the plurality of measurement values measured by the sensor are tampered.

* * * * *